(12) United States Patent
Hobbs et al.

(10) Patent No.: US 12,374,110 B2
(45) Date of Patent: *Jul. 29, 2025

(54) SYSTEM AND METHOD FOR PREDICTING FORMATION IN SPORTS

(71) Applicant: Stats LLC, Chicago, IL (US)

(72) Inventors: Jennifer Hobbs, Chicago, IL (US); Sujoy Ganguly, Chicago, IL (US); Patrick Joseph Lucey, Chicago, IL (US)

(73) Assignee: STATS LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/425,094

(22) Filed: Jan. 29, 2024

(65) Prior Publication Data

US 2024/0185604 A1 Jun. 6, 2024

Related U.S. Application Data

(63) Continuation of application No. 17/303,361, filed on May 27, 2021, now Pat. No. 11,935,298.

(Continued)

(51) Int. Cl.
*G06V 20/40* (2022.01)
*G06N 3/08* (2023.01)
*G06N 5/04* (2023.01)

(52) U.S. Cl.
CPC .............. *G06V 20/42* (2022.01); *G06N 3/08* (2013.01); *G06N 5/04* (2013.01)

(58) Field of Classification Search
None
See application file for complete search history.

(56) References Cited

U.S. PATENT DOCUMENTS

| 6,616,529 B1 | 9/2003 | Qian et al. |
| 6,710,713 B1 | 3/2004 | Russo |

(Continued)

FOREIGN PATENT DOCUMENTS

| CN | 1386241 A | 12/2002 |
| CN | 1708697 A | 12/2005 |

(Continued)

OTHER PUBLICATIONS

Using Machine Learning Approaches to Detect Opponent Formation. Asali et al. (Year: 2016).*

(Continued)

*Primary Examiner* — Delomia L Gilliard
(74) *Attorney, Agent, or Firm* — Bookoff McAndrews PLLC (57) ABSTRACT

A system and method of predicting a team's formation on a playing surface are disclosed herein. A computing system retrieves one or more sets of event data for a plurality of events. Each set of event data corresponds to a segment of the event. A deep neural network, such as a mixture density network, learns to predict an optimal permutation of players in each segment of the event based on the one or more sets of event data. The deep neural network learns a distribution of players for each segment based on the corresponding event data and optimal permutation of players. The computing system generates a fully trained prediction model based on the learning. The computing system receives target event data corresponding to a target event. The computing system generates, via the trained prediction model, an expected position of each player based on the target event data.

20 Claims, 5 Drawing Sheets

Related U.S. Application Data (60) Provisional application No. 63/035,137, filed on Jun. 5, 2020.

(56) References Cited

U.S. PATENT DOCUMENTS

| | | |
|---|---|---|
| 6,751,343 B1 | 6/2004 | Ferrell et al. |
| 9,342,785 B2 | 5/2016 | Lucey et al. |
| 9,442,933 B2 | 9/2016 | Tzoukermann et al. |
| 10,201,752 B2 | 2/2019 | Lucey et al. |
| 10,460,176 B2 | 10/2019 | Chang et al. |
| 11,157,742 B2 | 10/2021 | Zhang et al. |
| 11,182,806 B1 | 11/2021 | Arfa et al. |
| 11,232,109 B1 | 1/2022 | Knoll et al. |
| 2002/0165697 A1 | 11/2002 | Min |
| 2004/0148275 A1 | 7/2004 | Achlioptas |
| 2004/0148278 A1 | 7/2004 | Milo et al. |
| 2005/0143198 A1 | 6/2005 | Charge |
| 2006/0083304 A1 | 4/2006 | Pan et al. |
| 2006/0149674 A1 | 7/2006 | Cook et al. |
| 2006/0252476 A1 | 11/2006 | Bahou |
| 2007/0293289 A1 | 12/2007 | Loeb |
| 2008/0281444 A1 | 11/2008 | Krieger et al. |
| 2009/0186679 A1 | 7/2009 | Irvine et al. |
| 2009/0203447 A2 | 8/2009 | Hansen et al. |
| 2010/0129780 A1 | 5/2010 | Homsi et al. |
| 2010/0184495 A1 | 7/2010 | Levy et al. |
| 2010/0184563 A1 | 7/2010 | Molyneux et al. |
| 2010/0283630 A1 | 11/2010 | Alonso |
| 2010/0298958 A1 | 11/2010 | Connelly |
| 2011/0013087 A1 | 1/2011 | House et al. |
| 2011/0169959 A1 | 7/2011 | DeAngelis et al. |
| 2011/0173235 A1 | 7/2011 | Aman et al. |
| 2011/0267461 A1 | 11/2011 | Birenboim et al. |
| 2012/0162435 A1 | 6/2012 | Elangovan et al. |
| 2012/0214602 A1 | 8/2012 | Ahlstrom |
| 2013/0104870 A1 | 5/2013 | Rizzo et al. |
| 2013/0110271 A1 | 5/2013 | Fornell et al. |
| 2013/0225271 A1 | 8/2013 | Amaitis |
| 2013/0238106 A1 | 9/2013 | Ellis et al. |
| 2013/0267328 A1 | 10/2013 | Heisler et al. |
| 2014/0142921 A1 | 5/2014 | Gleadall et al. |
| 2014/0143183 A1 | 5/2014 | Sigal et al. |
| 2014/0206479 A1 | 7/2014 | Marty et al. |
| 2014/0236331 A1 | 8/2014 | Lehmann et al. |
| 2014/0274245 A1 | 9/2014 | Stickel |
| 2014/0302914 A1 | 10/2014 | Weinstein et al. |
| 2014/0309000 A1 | 10/2014 | Gustafson |
| 2014/0364976 A1 | 12/2014 | Wohl et al. |
| 2015/0031845 A1 | 1/2015 | Mccauley et al. |
| 2015/0058730 A1 | 2/2015 | Dubin et al. |
| 2015/0131845 A1 | 5/2015 | Forouhar et al. |
| 2015/0142716 A1 | 5/2015 | Lucey et al. |
| 2015/0148129 A1 | 5/2015 | Austerlade et al. |
| 2015/0248917 A1 | 9/2015 | Chang et al. |
| 2015/0258416 A1 | 9/2015 | Ianni et al. |
| 2015/0360134 A1 | 12/2015 | Rodriguez et al. |
| 2016/0007054 A1 | 1/2016 | Polumbus et al. |
| 2016/0096071 A1 | 4/2016 | Ianni et al. |
| 2016/0182415 A1 | 6/2016 | Ames et al. |
| 2016/0203279 A1 | 7/2016 | Srinivas et al. |
| 2016/0220878 A1 | 8/2016 | Devathi |
| 2016/0260015 A1 | 9/2016 | Lucey et al. |
| 2016/0375365 A1 | 12/2016 | Thompson et al. |
| 2017/0043260 A1 | 2/2017 | Austerlade et al. |
| 2017/0061314 A1 | 3/2017 | Schnurr et al. |
| 2017/0072321 A1 | 3/2017 | Thompson et al. |
| 2017/0080336 A1 | 3/2017 | Groset et al. |
| 2017/0109015 A1 | 4/2017 | Krasadakis |
| 2017/0132821 A1 | 5/2017 | Valliani et al. |
| 2017/0165570 A1 | 6/2017 | Lucey et al. |
| 2017/0166557 A1 | 6/2017 | Golden et al. |
| 2017/0235848 A1 | 8/2017 | Van et al. |
| 2017/0238055 A1 | 8/2017 | Chang et al. |
| 2017/0246539 A1 | 8/2017 | Schwartz et al. |
| 2017/0255830 A1 | 9/2017 | Chen et al. |
| 2017/0257653 A1 | 9/2017 | Farré Guiu et al. |
| 2017/0259178 A1 | 9/2017 | Aghdaie et al. |
| 2017/0291093 A1 | 10/2017 | Janssen et al. |
| 2017/0330029 A1 | 11/2017 | Turcot et al. |
| 2018/0032858 A1* | 2/2018 | Lucey ............... G06N 3/08 |
| 2018/0056124 A1 | 3/2018 | Marty et al. |
| 2018/0084310 A1 | 3/2018 | Katz et al. |
| 2018/0099201 A1 | 4/2018 | Marty et al. |
| 2018/0137364 A1 | 5/2018 | Forouhar et al. |
| 2018/0157974 A1 | 6/2018 | Carr et al. |
| 2018/0158196 A1 | 6/2018 | Marks |
| 2018/0204111 A1 | 7/2018 | Zadeh et al. |
| 2018/0213033 A1 | 7/2018 | Subbian |
| 2018/0218243 A1 | 8/2018 | Felsen et al. |
| 2019/0087661 A1 | 3/2019 | Lee et al. |
| 2019/0205652 A1 | 7/2019 | Ray et al. |
| 2019/0221072 A1 | 7/2019 | Litman |
| 2019/0224556 A1 | 7/2019 | Ruiz et al. |
| 2019/0228290 A1 | 7/2019 | Ruiz et al. |
| 2019/0228306 A1 | 7/2019 | Power et al. |
| 2019/0251366 A1 | 8/2019 | Zhong et al. |
| 2019/0374839 A1 | 12/2019 | Wanke et al. |
| 2020/0004752 A1 | 1/2020 | Majumdar et al. |
| 2020/0043287 A1* | 2/2020 | Zhang ............ G06V 40/103 |
| 2020/0074181 A1 | 3/2020 | Chang et al. |
| 2020/0170549 A1 | 6/2020 | Baykaner et al. |
| 2020/0218902 A1 | 7/2020 | Chang et al. |
| 2020/0230501 A1 | 7/2020 | Schwartz et al. |
| 2020/0302181 A1 | 9/2020 | Bhanu et al. |
| 2020/0336802 A1 | 10/2020 | Russell et al. |
| 2020/0349611 A1 | 11/2020 | Publicover et al. |
| 2020/0353311 A1 | 11/2020 | Ganguly et al. |
| 2021/0056458 A1 | 2/2021 | Savova et al. |
| 2021/0134124 A1 | 5/2021 | Srinivasan |
| 2021/0142066 A1 | 5/2021 | Jayaram et al. |
| 2021/0256265 A1 | 8/2021 | Gurpinar-Morgan et al. |
| 2021/0272599 A1 | 9/2021 | Patterson et al. |
| 2021/0304736 A1 | 9/2021 | Kothari et al. |
| 2021/0383123 A1 | 12/2021 | Hobbs et al. |
| 2021/0397846 A1 | 12/2021 | Chang et al. |
| 2022/0055689 A1 | 2/2022 | Mandlekar et al. |
| 2022/0067983 A1 | 3/2022 | Fidler et al. |
| 2022/0253679 A1 | 8/2022 | Power et al. |
| 2022/0270004 A1 | 8/2022 | Ruiz et al. |
| 2022/0284311 A1 | 9/2022 | Haynes et al. |

FOREIGN PATENT DOCUMENTS

| | | |
|---|---|---|
| CN | 102819749 A | 12/2012 |
| CN | 105833502 A | 8/2016 |
| KR | 100986647 B1 | 10/2010 |
| WO | 0122270 A2 | 3/2001 |
| WO | 2013166456 A2 | 11/2013 |
| WO | 2014008134 A1 | 1/2014 |
| WO | 2015076682 A1 | 5/2015 |
| WO | 2017031356 A1 | 2/2017 |
| WO | 2017161167 A1 | 9/2017 |
| WO | 2020010040 A1 | 1/2020 |

OTHER PUBLICATIONS

Felsen, et al., "Where will they go? predicting fine-grained adversarial multi-agent motion using conditional variational autoencoders," Proceedings of the European conference on computer vision (ECCV), 2018, pp. 761-776.

Frey, et al., "Clustering by Passing Messages Between Data Points" Science Magazine, Feb. 15, 2007, 23 pages.

Goddard, et al., "Modelling football match results and the efficiency of fixed-odds betting", Published 2004, 27 pages.

Graves, "Generating Sequences with Recurrent Neural Networks", arXiv: 1308.0850v5, Dated Jun. 5, 2014, 43 pages.

Gregor, et al., "DRAW: A Recurrent Neural Network For Image Generation", arXiv preprint arXiv:1502.04623, May 20, 2015, 10 pages.

Gyarmati, et al., "Searching for a unique style in soccer," arXiv preprint arXiv:1409.0308, 2014, 4 pages.

(56) References Cited

OTHER PUBLICATIONS

Hinton, et al. "A Fast Learning Algorithm for Deep Belief Nets", Neural Comput, 18(7), 2006, pp. 1527-1554.
Ho, "Random Decision Forests", Published 1995 IEEE, pp. 278-282.
Huang et al., "Graph Analysis of Major League Soccer Networks: CS 224W Final Project", Stanford University, (Dec. 9, 2018), pp. 1-9, URL: http://snap.stanford.edu/ctass/cs224w-2018/reports/CS224W-2018-46.pdf, (May 31, 2022), XP055968318.
Huang, et al., "A Neural Network Method for Prediction of 2006 World Cup Football game", Published 2010 IEEE, 8pages.
Hubacek, et al., "Lifted Relational Team Embeddings for Predictive Sports Analytics," ILP Up-and-Coming/ ShortPapers, 2018, 7 pages.
International Preliminary Report on Patentability for International Application No. PCT/US2016/066733, mailed Jun. 28, 2018, 9 Pages.
International Preliminary Report on Patentability for International Application No. PCT/US2019/014608, mailed Jul. 30, 2020, 10 Pages.
International Preliminary Report on Patentability for International Application No. PCT/US2019/014609, mailed Jul. 30, 2020, 08 Pages.
International Preliminary Report on Patentability for International Application No. PCT/US2019/014613, mailed Jul. 30, 2020, 07 Pages.
International Preliminary Report on Patentability for International Application No. PCT/US2019/014614, mailed Jul. 30, 2020, 6 Pages.
International Preliminary Report on Patentability for International Application No. PCT/US2020/020432, mailed Sep. 16, 2021, 10 Pages.
International Preliminary Report on Patentability for International Application No. PCT/US2020/032053, mailed Nov. 18, 2021, 08 Pages.
International Preliminary Report on Patentability for International Application No. PCT/US2021/016583, mailed Aug. 18, 2022, 11 Pages.
International Preliminary Report on Patentability for International Application No. PCT/US2021/034568, mailed Dec. 15, 2022, 8 Pages.
International Preliminary Report on Patentability for the Application No. PCT/US2021/053117, mailed Apr. 13, 2023, 8 pages.
International Search Report and Written Opinion for International Application No. PCT/US2020/020432, mailed May 28, 2020, 11 Pages.
International Search Report and Written Opinion for International Application No. PCT/US2020/032053, mailed Sep. 29, 2020, 09 Pages.
International Search Report and Written Opinion for PCT Application No. PCT/US2016/066733, dated Apr. 17, 2017, 11 pages.
International Search Report and Written Opinion for PCT Application No. PCT/US2019/014609, dated Apr. 12, 2019, 10 pages.
International Search Report and Written Opinion for PCT Application No. PCT/US2019/014613, dated Apr. 12, 2019, 9 pages.
Jain, et al., "Recurrent Neural Networks for Driver Activity Anticipation via Sensory-Fusion Architecture", IEEE International Conference on Robotics and Automation (ICRA), 2016, 8 pages.
Janetzko, et al., "Feature-driven visual analytics of soccer data," 2014 IEEE conference on visual analytics science and technology (VAST), Nov. 2014, pp. 13-22.
Ji, et al., "NBA All-Star lineup prediction based on neural networks," 2013 International Conference on Information Science and Cloud Computing Companion, 2013, pp. 864-869.
Kharrat, et al., "Plus-Minus Player Ratings for Soccer", arXiv: 1706.04943v1, Dated Jun. 16, 2017, 17 pages.
Kim, et al., "Motion Fields to Predict Play Evolution in Dynamic Sport Scenes", IEEE Computer Society Conference on Computer Vision and Pattern Recognition, 2010, 8 pages.
Kingma, et al., "Adam: A Method for Stochastic Optimization", arXiv:1412.6980v9, ICLR 2015, Dated Jan. 30, 2017, 15 pages.
Kingma, et al., "Semi-supervised Learning with Deep Generative Models", Advances in neural information processing systems, Oct. 31, 2014, 9 pages.
Kingman, et al., "Auto-Encoding Variational Bayes", arXiv preprint arXiv:1312.6114, May 1, 2014, 14 pages.
Kinoshita, et al., "Deep mixture density network for statistical model-based feature enhancement," 2017 IEEE International Conference on Acoustics, Speech and Signal Processing (ICASSP), Mar. 2017, pp. 251-255.
Knauf, et al., "Spatio-temporal convolution kernels," Machine learning 102.2, Jul. 2015, 28 pages.
Koopman, et al., "A dynamic bivariate Poisson model for analysing and forecasting match results in the EnglishPremier League", Dated Sep. 24, 2012, 30 pages.
Koren, et al., "Matrix Factorization Techniques For Recommender Systems", Computer, IEEE Computer Society, Aug. 2009, 8 pages.
Le, et al., "Coordinated Multi-Agent Imitation Learning", Proceedings of the 34th International Conference on Machine Learning—vol. 70. JMLR. org, 2017, 13 pages.
Le, et al., "Data-Driven Ghosting using Deep Imitation Learning", MIT Sloan Sports Analytics Conference, Mar. 3-4, 2017, 15 pages.
Learned-Miller E.G., "Data Driven Image Models through Continuous Joint Alignment," IEEE Transactions on Pattern Analysis and Machine Intelligence, Feb. 2006, vol. 28, No. 2, pp. 236-250.
Lee, et al., "Desire: Distant Future Prediction in Dynamic Scenes with Interacting Agents", Proceedings of the IEEE Conference on Computer Vision and Pattern Recognition, 2017, 10 pages.
Liang, et al., "Dual motion GAN for future-flow embedded video prediction," proceedings of the IEEE International conference on computer vision, 2017, 9 pages.
Insafutdinov, et al., "Art Track: Articulated Multi-Person Tracking in the Wild", Proceedings of the IEEE Conference on Computer Vision and Pattern Recognition, 2017, 9 pages.
Lock, et al., "Using random forests to estimate win probability before each play of an NFL game", JOAS 2014; 10(2); Published 2014, pp. 197-205.
Lucey, et al., "Quality vs Quantity: Improved Shot Prediction in Soccer using Strategic Features from SpatiotemporalData", 9th Annual MIT Sloan Sports Analytics Conference, Feb. 27-28, 2015, 9 pages.
Lucey, et al., "Representing and Discovering Adversarial Team Behaviors using Player Roles", Proceedings of the IEEE Conference on Computer Vision and Pattern Recognition, 2013, 8 pages.
Maaten, et al., "Visualizing data using t-SNE", Journal of machine learning research 9/08, pp. 2579-2605, Nov. 2008.
Machine Learning Notebook, "Convolutional Neural Networks—Basics," https://mlnotebook.github.io/post/CNN1/, Apr. 7, 2017, 13 pages.
Maher, "Modelling Association Football Scores", Statistica Neerlandica 36, nr.3, Published 1982, pp. 109-118.
Elie Aljalbout et al: "Clustering with 1,6, 11 Deep Learning: Taxonomy and New Methods", arxiv.org, Cornell University Library, 201 Olin Library Cornell University Ithaca, NY 14853, Jan. 23, 2018.
Jennifer Hobbs et al: "Improved Structural Discovery and Representation Learning of Multi-Agent Data", arxiv.org, Cornell University Library, 201 Olin Library Cornell University Ithaca, NY 14853, Dec. 30, 2019.
Wang, et al., "Classifying NBA offensive plays using neural networks," Proceedings of MIT Sloan Sports Analytics Conference, vol. 4, 2016, 9 pages.
Wang, et al., "Learning Optimal Parameters For Multi-target Tracking", International journal of computer vision 122.3, 2017, 13 pages.
Wei X., et al., "Large-Scale Analysis of Formations in Soccer," Proceedings of the Digital Image Computing: Technqiues and Applications (DICTA), IEEE, Nov. 26, 2013, pp. 1-8, XP032536466, DOI: 10.1109/ DICTA.2013.6691503.
Wei X., et al., "Predicting Serves in Tennis Using Style Priors," Proceedings of the 21th ACM SIGKDD International Conference on Knowledge Discovery and Data Mining, 2015, 9 pages.

(56) References Cited

OTHER PUBLICATIONS

Wei, "Modelling and Predicting Adversarial Behaviors using Large Amounts of Spatiotemporal Data," Queensland University of Technology, 2016, 164 pages.
Wei, et al., "The thin edge of the wedge: Accurately predicting shot outcomes in tennis using style and context priors", Proceedings of the 10th Annual MIT Sloan Sport Anal Conference, Mar. 2016.
Wright, "Liverpool's set-piece problem exposed in 3-3 draw with Watford", https://www.skysports.com/football/news/15117/10985307/liverpools-set-piece-problem-exposed-in-3-3-draw-with-watford, Dec. 8, 2017, 9 pages.
Yamaguchi, et al., "Who are you with and Where are you going?", CVPR 2011. IEEE, 2011, 8 pages.
Yue, et al., "Learning Fine-Grained Spatial Models for Dynamic Sports Play Prediction", ICDM, 2014, 10 pages.
Zhao, "Research and Application of Online Learning of Formation Strategy Based on Neural Network Information Technology Collection of China Masters' Dissertations Full Text Database," No. 2, 2014, pp. 38-40.
Zhao, Yu, et al., "Applying deep bidirectional LSTM and mixture density network for basketball trajectory prediction,"Optik, 2018, pp. 266-272. □35.
Zheng, et al., "Generating Long-term Trajectories Using Deep Hierarchical Networks", Advances in Neural Information Processing Systems, 2016, 9 pages.
Abdullah, et al., "Intelligent prediction of soccer technical skill on youth soccer player's relative performance using24 multivariate analysis and artificial neural network techniques," International Journal on Advanced Science, Engineering and Information Technology 6.5, Dec. 2016, pp. 668-674.
Abreu, et al., "Improving a simulated soccer team's performance through a Memory-Based Collaborative Filtering approach," Applied Soft Computing 23, 2014, pp. 180-193.
Acuna, "Unsupervised modeling of the movement of basketball players using a deep generative model," 31st Conference on Neural Information Processing Systems, 2017, 11 pages.
Al-Shboul, et al., "Automated Player Selection for Sports Team using Competitive Neural Networks", International Journal of Advanced Computer Science and Applications (IJACSA), vol. 8, No. 8, 2017, pp. 457-460.
Akhter, et al., "Bilinear Spatiotemporal Basis Models", ACM Transactions on Graphics, vol. 30, No. 2, Article 17, Apr. 2012, 12 pages.
Alahi, et al., "Social LSTM: Human Trajectory Prediction in Crowded Spaces", Proceedings of the IEEE conference on computer vision and pattern recognition, 2016, 11 pages.
Alcorn, "(batterlpitcher) 2vec: statistic-free talent modeling with neural player embeddings", MIT Sloan Sports Analytics Conference, 2018.
Anderson, et al., "The Numbers Game: Why Everything You Know About Soccer is Wrong", 2013, Penguin Books.
Arabzad, et al., "Football match results prediction using artificial neural networks; the case of Iran Pro League," Journal of Applied Research on Industrial Engineering 1.3, Oct. 9, 2014, pp. 159-179.
Asif, et al., "In-Play forecasting of win probability in One-Day International cricket: A dynamic logistic regressionmodel", International Journal of Forecasting 32, Published 2016, pp. 34-43.
Bengio, et al., "A Neural Probabilistic Language Model", Journal of Machine Learning Research 3, Published 2003, pp. 1137-1155.
Beuoy, "Updated NBA Win Probability Calculator", InPredictable, http://www.inpredictable.com/2015/02/updated-nba-win-probability-calculator.html, Dated Feb. 6, 2015, 4 pages.
Bialkowski, et al., "Large-Scale Analysis of Soccer Matches using Spatiotemporal Tracking Data", IEEE InternationalConference on Data Mining, 2014, 6 pages.
Bishop, "Mixture Density Networks", Neural Computing Research Group Report, NCRG/94/004, Dated Feb. 1994,26 pages.
Blaikie, et al., "NFL & NCAA Football Prediction using Artificial Neural network," Proceedings of the MidstatesConference for Undergraduate Research in Computer Science and Mathematics, 2011, 8 pages.

Blei, et al., "Latent Dirichlet Allocation", Journal of Machine Learning Research 3, Published 2003, pp. 993-1022.
Boice, "How Our Club Soccer Projections Work", FiveThirtyEight, https://fivethirtyeight.com/features/how-our-club-soccer-projections-work/, Dated Jan. 19, 2017, 6 pages.
Boshnakov, et al., "A Bivariate Weibull Count Model For Forecasting Association Football Scores", Dated Sep. 9, 2016, 13 pages.
Bowman, et al., "Generating Sentences from a Continuous Space", arXiv preprint arXiv:1511.06349, May 12, 2016, 12 pages.
Butt, et al., "Multi-target Tracking by Lagrangian Relaxation to Min-Cost Network Flow", Proceedings of the IEEE Conference on Computer Vision and Pattern Recognition, 2013, 8 pages.
Carney, et al., "Predicting probability distributions for surf height using an ensemble of mixture density networks, "Proceedings of the 22nd international conference on Machine learning, 2005, 8 pages.
Casal, et al., "Analysis of Corner Kick Success in Elite Football", International Journal of Performance Analysis in Sport 2015, pp. 430-451.
CD160 isoforms and regulation of CD4 and CDS T-cell responses, Authors: Mohamed El-Far, Charles Pellerin, LouisePilate, Jean-Francois Fortin, Ivan AD Lessard, Yoav Peretz, Elizabeth Wardrop, Patrick Salois, Richard C Bethell, Michael G Cordingley, George Kukolj, Publication data: Journal of Translational Medicine,,Sep. 2, 2014, BioMed Central, Source info: vol. 12, Nr: 1, p. 217.
Cervone, et al., "A multiresolution stochastic process model for predicting basketball possession outcomes," Journal of the American Statistical Association 111.514, 2016, pp. 585-599.
Cervone, et al., "Pointwise: Predicting Points and Valuing Decisions in Real Time with NBA Optical Tracking Data", 8th Annual MIT Sloan Sports Analytics Conference, Feb. 28-Mar. 1, 2014, 9 pages.
Chandler, et al., "An exploratory study of minor league baseball statistics," Journal of Quantitative Analysis in Sports 8.4, 2012, 37 pages.
Charles, et al., "Personalizing Human Video Pose Estimation", Proceedings of the IEEE conference on computer visionand pattern recognition, 2016, 14 pages.
Chen, et al., "Learning Online Smooth Predictors for Realtime Camera Planning using Recurrent Decision Trees", Proceedings of the IEEE Conference on Computer Vision and Pattern Recognition, 2016, 14 pages.
Cheng, et al., "Wide & deep learning for recommender systems", Proceedings of the 1st workshop on deep learning forrecommender systems, Sep. 2016.
Chung, et al., "Hierarchical Multiscale Recurrent Neural Networks", ICLR 2017, arXiv:1609.01704v7, Dated Mar. 9, 2017, 13 pages.
Covington, et al., "Deep neural networks for youtube recommendations", Proceedings of the 10th ACM conference onrecommender systems, pp. 191-198, Sep. 2016.
Cox, et al., "Least Squares Congealing for Unsupervised Alignment of Images", CVPR, 2008, 8 pages.
Deerwester, et al., "Indexing by Latent semantic Analysis", Published 1990, 34 pages.
Deng, et al., "Factorized Variational Autoencoders for Modeling Audience Reactions to Movies", Proceedings of the IEEE Conference on Computer Vision and Pattern Recognition, 2017, 10 pages.
Dertat, et al., "Applied deep learning-part 4: Convolutional neural networks," Towards Data Science 26, https://2towardsdatascience.com/applied-deep-learning-part-4-convolutional-neural-networks-584bc134c1 e2, Nov. 8, 2017, 26 pages.
Dinsdale, et al., "Interactive Gaming in Sports," U.S. Appl. No. 17/934,756, filed Sep. 23, 2022, 39 pages.
Dixon, et al., "Modelling Association Football Scores and Inefficiencies in the Football Betting Market", Appl Statist 46. No 2, Published 1997, pp. 265-280.
Dubow, "San Antonio Spurs' Kawhi Leonard ruled out for Game 2 vs. Golden State Warriors", http://www.nba.com/article/2017 /05/15/san-antonio-spurs-kawhi-leonard-out-game-2, Dated May 15, 2017, 4 pages.
Edge AI and Vision Alliance, "Using Cconvolutional Neural Networks fo Image Recognition," https://www.edge-ai-vision.com/2015/11/using-convolutional-neural-networks-for-image-recognition/, Nov. 12, 2015, 20 pages.

(56) References Cited

OTHER PUBLICATIONS

ESPN Staff, "Neymar from Barca to PSG for €222m: Timeline of the world's biggest transfer", ESPN, http://www.espn.com/soccer/blog/soccer-transfers/613/posU3170513/neymar-from-barcelona-to-psg-for-222m-euros-timeline-as-worlds-biggest-transfer-nears, Aug. 4, 2017, 18 pages.
Examination Report No. 1 for Australian Patent Application No. 2022201634 dated Mar. 7, 2023, 4 pages.
Extended European Search Report for Application No. 20801519.8, dated May 19, 2023, 7 pages.
Extended European Search Report for European Application No. 16876628.5, mailed Jan. 29, 2020, 17 Pages.
Extended European Search Report for European Application No. 19740811.5, mailed Sep. 21, 2021, 10 Pages.
Extended European Search Report for European Application No. 19741311.5, mailed Sep. 15, 2021, 09 Pages.
Extended European Search Report for European Application No. 19741603.5, mailed Jun. 2, 2022, 11 Pages.
Extended European Search Report for European Application No. 19741793.4, mailed Jun. 28, 2022, 10 Pages.
Extended European Search Report for European Application No. 20765556.4, mailed Oct. 7, 2022, 12 pages.
Felsen, et al., "Body shots: Analyzing shooting styles in the NBA using body pose", MIT Sloan, Sports Analytics Conference, Mar. 2017.
Felsen, et al., "What will Happen Next? Forecasting Player Moves in Sports Videos", Proceedings of the IEEE International Conference on Computer Vision, 2017, 10 pages.
Maksai, et al., "What Players do with the Ball: A Physically Constrained Interaction Modeling", Proceedings of the IEEE Conference on Computer Vision and Pattern Recognition, 2016, 10 pages.
McCabe, et al., "Artificial intelligence in sports prediction," Fifth International Conference on Information Technology: New Generations, IEEE Computer Society, Apr. 9, 2008, 4 pages.
Mehrotra, "Elements of artifical neural networks," MIT Press, 1997.
Merhej, et al., "What Happened Next? Using Deep Learning to Value Defensive Actions in Football Event-Data," KDD, Aug. 2021, pp. 3394-3403.
Mikolov, et al., "Distributed Representations of Words and Phrases and their Compositionality", Published 2013, 9 pages.
Mikolov, et al., "Efficient Estimation of Word Representations in Vector Space", arXiv: 1301.3781 v3, Dated Sep. 7, 2013, 12 pages.
Miller, et al., "Factorized Point Process Intensities: A Spatial Analysis of Professional Basketball", ICML, Jan. 8, 2014, 13 pages.
Nakashima, et al., "Off-line learning of soccer formations from game logs," 2010 World Automation Congress, 2010, 6 pages.
Newton, "How Youtub Perfected The Feed", The Verge, https://www.theverge.com/2017/8/30/16222850/youtube-google-brain-algorithm-video-recommendation-personalized-feed, Aug. 30, 2017.
Office Action for European Patent Application No. 20801519.8, mailed Jun. 6, 2023, 1 page.
Paine, "The Pats' Comeback Was Incredible—Even If You Think The Falcons Blew It", FiveThirtyEight, https://fivethirtyeight.com/features/patriots-falcons-comeback-super-bowl/, Dated Feb. 6, 2017, 4 pages.
Partial Supplementary European Search Report for European Application No. 16876628.5, mailed Aug. 14, 2019, 16 Pages.
Pathak, et al., "Contect Encoders: Feature Learning by Inpainting", Proceedings of the IEEE conference on computervision and pattern recognition, 2016, 12 pages.
PCT International Application No. PCT/US 19114608, International Search Report and Written Opinion of the International Searching Authority, dated Apr. 15, 2019, 12 pages.
PCT International Application No. PCT/US 19114614, International Search Report and Written Opinion of the International Searching Authority, dated Apr. 16, 2019, 9 pages.
PCT International Application No. PCT/US21/16583, International Search Report and Written Opinion of the International Searching Authority, dated Apr. 23, 2021, 11 pages.
PCT International Application No. PCT/US21/34568, International Search Report and Written Opinion of the International Searching Authority dated Aug. 25, 2021, 9 pages.
PCT International Application No. PCT/US21/53117, International Search Report and Written Opinion of the International Searching Authority, dated Jan. 14, 2022, 9 pages.
PCT International Application No. PCT/US22/15240, International Search Report and Written Opinion of the International Searching Authority, dated May 11, 2022, 7 pages.
PCT International Application No. PCT/US22/17229, International Search Report and Written Opinion of the International Searching Authority, dated Jun. 9, 2022, 9 pages.
PCT International Application No. PCT/US22/18709, International Search Report and Written Opinion of the International Searching Authority, dated Jun. 24, 2022, 11 pages.
PCT International Application No. PCT/US22/76934, International Search Report and Written Opinion of the International Searching Authority, dated Dec. 13, 2022, 10 pages.
PCT International Application No. PCT/US22/77383, International Search Report and Written Opinion of the International Searching Authority, dated Dec. 13, 2022, 15 pages.
Pelechrinis, "iWinRNFL: A Simple, Interpretable & Well-Calibrated In-Game Win Probability Model for NFL", arXiv:1704.00197v3, Dated Mar. 14, 2018, 7 pages.
Peng, et al., "RASL: Robust Alignment by Sparse and Low-rank Decomposition for Linearly Correlated Images", PAMI, vol. 34, No. 11, 2012, 8 pages.
Perricone, et al., "Predicting Results for Professional Basketball Using NBA API Data," 2016, 6 pages.
Pettersson, et al., "Football match prediction using deep learning," Department of Electrical Engineering, Chalmers University of Technology, 2017, 72 pages.
Pourmehr, et al., "An overview on opponent modeling in RoboCup soccer simulation 2D," Springer, 2011, pp. 402-414.
Power, et al., "Not all passes are created equal: Objectively measuring the risk and reward of passes in soccer from 26 tracking data," Proceedings of the 23rd ACM SIGKDD international conference on knowledge discovery and data mining, Aug. 2017, pp. 1605-1613.
Preferred Networks, Inc., "Football Analytics using Deep Learning," YouTube, https://www.youtube.com/watch?v=hs_v3dv6OUl, Jul. 25, 2019, 3 pages.
Pulling, "Long Corner Kicks In The English Premier League: Deliveries Into The Goal Ara And Critical Area", Kinesiology: International journal of fundamental and applied kinesiology 4 7.2, 2015, pp. 193-201.
Ross, et al., "Shortcomings in the attribution process: On the origins and maintenance of erroneous social assessments", Cambridge University Press, 1982, pp. 129-152.
Ruiz, et al., "The Leicester City Fairytale?" Utilizing New Soccer Analytics Tools to Compare Performance in the 15/1628 & 16/17 EPL Seasons, Proceedings of the 23rd ACM SIGKDD International Conference on Knowledge Discovery and Data Mining, 2017, 13 pages.
Schechtman-Rock, "Introducing NFLWin: An Open Source Implementation of NFL Win Probability", PhD Football, http://phdfootball.blogspot.com/2016/09/introducing-nflwin-open-source.html, Dated Sep. 1, 2016, 4 pages.
Seidl, et al., "Bhostgusters: Realtime interactive play sketching with synthesized NBA defenses", Proceeding of the 12th MIT Sloan Sports Analytics Conference, 2018.
Sha, et al., "Chalkboarding: A New Spatiotemporal Query Paradigm for Sports Play Retrieval", IUI, 2016, 12 pages.
Sha, et al., "Fine-Grained Retrieval of Sports Plays using Tree-Based Alignment of Trajectories", arXiv preprintarXiv:1710.02255, Oct. 6, 2017, 10 pages.
Sohn, et al., "Learning Structured Output Representation using Deep Conditional Generative Models", Advances inneural information processing systems, 2015, 9 pages.
Srinivas, et al., "A taxonomy of deep convolutional neural nets for computer vision," Frontiers in Robotics and AI 2, Jan. 11, 2016, 13 pages.

(56) References Cited

OTHER PUBLICATIONS

Stein, et al. "Bring it to the pitch: Combining video and movement data to enhance team sport analysis," IEEE transactions on visualization and computer graphics 24.1,2017,, pp. 13-22.
Su, et al., "Social Behavior Prediction from First Person Videos", arXiv preprint arXiv:1611.09464, Nov. 29, 2016,10 pages.
The CD160A+ CD8AhAiAgAh cytotoxic T cell subset correlates with response to HMRT in HIV-1+ patients, Authors: Nikolova, Muhtarova M H, Taskov M N, Kostov H B, Vezenkov K, Mihova L, Boumsell A, Bensussan L, A, Publicationdata: Cellular Immunology,,Oct. 1, 2005,Academic Press, San Diego, CA, US, Source info: vol. 237, Nr: 2, pp. 96-105.
Tian, et al., "Use of machine learning to automate the identification of basketball strategies using whole team player tracking data," Applied Sciences 10.1, Dec. 18, 2019, 17 pages.
Trainor, "Goalkeepers: How repeatable are shot saving performances?", STATSBOMB, https://statsbomb.com/2014/10/goalkeepers-how-repeatable-are-shot-saving-performances/, Oct. 21, 2014.
Van den Oard, et al., "Pixel Recurrent Neural Networks", arXiv preprint arXiv: 1601.06759, Aug. 19, 2016, 11 pages.
Van den Oard, et al., "WaveNet: A Generative Model For Raw Audio", arXiv:1609.03499v2, Dated Sep. 19, 2016, 15 pages.
Wagenaar, "Predicting Goal-Scoring Opportunities in Soccer by Using Deep Convolutional Neural Networks, "Department of Artificial Intelligence, University of Groningen, Nov. 16, 2016, 65 pages.
Wagenaar, et al. "Using deep convolutional neural networks to predict goal-scoring opportunities in soccer,"International Conference on Pattern Recognition Applications and Methods, vol. 2, SCITEPRESS, 2017, 8 pages.
Walker, et al., "An Uncertain Future: Forecasting from Static Images using Variational Autoencoders", EuropeanConference on Computer Vision, 2016, 17 pages.
Walters, "Virgil van Dijk transfer may not fix Liverpool's dismal defending of set-pieces warns Jurgen Klopp after Watford woe", https://www.mirror.co.uk/sport/football/news/liverpool-klopp-van-dijk-setpiece-10981217, Aug. 13, 2017, 21 pages.

* cited by examiner

FIG. 5B

SYSTEM AND METHOD FOR PREDICTING FORMATION IN SPORTS

CROSS-REFERENCE TO RELATED APPLICATIONS

This application is a continuation of, and claims the benefit of priority to, U.S. application Ser. No. 17/303,361, filed on May 27, 2021, which claims priority to U.S. Provisional Application No. 63/035,137, filed on Jun. 5, 2020, the entireties of each of which are incorporated herein by reference.

FIELD OF THE DISCLOSURE

The present disclosure generally relates to a system and method for predicting formation in sports.

BACKGROUND

Increasingly, sports fans and data analysts have become entrenched in sports analytics. In some situations, especially on the team-side and analyst-side of sports analytics, predicting an opponent's formation could be critical to a team's strategy heading into a game or match. The act of predicting an opponent's or team's formation has not been a trivial task, however. There is an inherent permutation disorder in team sports, which increases the difficulty at which a system can predict a team's formation or a positioning of a team's players on a playing surface given limited information.

SUMMARY

In some embodiments, a method of predicting a team's formation on a playing surface is disclosed herein. A computing system retrieves one or more sets of event data for a plurality of events. Each set of event data corresponds to a segment of the event. A deep neural network learns to predict an optimal permutation of players in each segment of the event based on the one or more sets of event data. The deep neural network learns a distribution of players for each segment based on the corresponding event data retrieved from data store and optimal permutation of players. The computing system generates a fully trained prediction model based on the learning. The computing system receives target event data corresponding to a target event. The target event data includes information directed to a team comprising a plurality of players on a playing surface. The computing system generates, via the trained prediction model, an expected position of each player of the plurality of players on the playing surface based on the target event data.

In some embodiments, a system for predicting a team's formation on a playing surface is disclosed herein. The system includes a processor and a memory. The memory has programming instructions stored thereon, which, when executed by the processor, performs one or more operations. The one or more operations include retrieving one or more sets of event data for a plurality of events. Each set of event data corresponds to a segment of the event. The one or more operations further include learning, by a deep neural network, to predict an optimal permutation of players in each segment of the event based on the one or more sets of event data. The one or more operations further include learning, by the deep neural network, a distribution of players for each segment based on the corresponding event data retrieved from data store and optimal permutation of players. The one or more operations further include generating a fully trained prediction model based on the learning. The one or more operations further include receiving target event data corresponding to a target event. The target event data includes information directed to a team comprising a plurality of players on a playing surface. The one or more operations further include generating, by the trained prediction model, an expected position of each player of the plurality of players on the playing surface based on the target event data.

In some embodiments, a non-transitory computer readable medium is disclosed herein. The non-transitory computer readable medium includes one or more sequences of instructions that, when executed by the one or more processors performs one or more operations. The one or more operations include retrieving one or more sets of event data for a plurality of events. Each set of event data corresponds to a segment of the event. The one or more operations further include learning, by a deep neural network, to predict an optimal permutation of players in each segment of the event based on the one or more sets of event data. The one or more operations further include learning, by the deep neural network, a distribution of players for each segment based on the corresponding event data retrieved from data store and optimal permutation of players. The one or more operations further include generating a fully trained prediction model based on the learning. The one or more operations further include receiving target event data corresponding to a target event. The target event data includes information directed to a team comprising a plurality of players on a playing surface. The one or more operations further include generating, by the trained prediction model, an expected position of each player of the plurality of players on the playing surface based on the target event data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

A team's formation is of key interest in continuous sports, but particularly soccer. Identifying a team's formation directly from data is challenging, however, because of the inherent permutation disorder of sports. Conventional systems have taken several different approaches to eliminate permutation noise. For example, conventional systems have used a codebook of manually labeled roles to eliminate permutation roles. In another example, conventional systems have utilized expectation maximization to automatically determine the role assignment of each player. In such example, the system observes the formation once the permutation noise has been eliminated. In another example, conventional systems have combined an expectation maximization approach with a clustering algorithm that clustered the formations (i.e., templates) observed in each game to identify archetypal formations such as a 4-4-2 formation and a 4-2-3-1 formation in a weakly supervised approach. In another example, conventional systems have utilized a tree-based clustering approach to find a hierarchy of formations (e.g., such as in basketball) and align players at each level of the tree before further splitting.

In all of the above conventional systems, however, a template (or templates) is learned from a training set. All subsequent data is then aligned to this template or templates. To analyze the formation in a given context, the conventional systems apply a filter to select the data of interest (e.g., specific team, game, and scoreline) and the formation is obtained by observing the positional distribution of each role once the permutation has been eliminated. Once the permutation disorder is removed, it remains difficult to find context-specific formations (e.g., while defending, on the counter-attack, when trailing, etc.) because of the number of examples within a specific context is limited.

The one or more techniques described herein improve upon conventional techniques by providing a prediction algorithm which may learn (i.e., predict) the formation of a team in a specific context instead of relying on filtering methods. Further, the one or more techniques described herein may use an end-to-end approach that both eliminates permutation disorder and may predict the expected positional distribution of the players (i.e., the formation). Such techniques may be achieved using a neural network framework with a Gumbel-Sinkhorn (GS) layer and mixture density network. For example, the GS layer may be trained to learn the optimal permutation, while the mixture density network may be trained to predict a distribution of player positions given the input context (such as, but not limited to, team, possession, ball location, etc.) and the permutation output by the GS layer.

Through the one or more techniques described herein, the prediction engine may enable teams and organization to generate a more accurate formational analysis. For example, the prediction engine described herein may allow teams or organization to identify the formation of a team in a highly-specific scenario or even a previously un-observed scenario, find smooth variations in a formation as a function of context, and capture the co-movements of players instead of treating each as an independent entity. Further, through the prediction engine, positional disorder in a team's current position may be quantified. Overall, by improving the permutation eliminating step, prediction engine may be able to provide more accurate downstream predictions.

Figure 1:
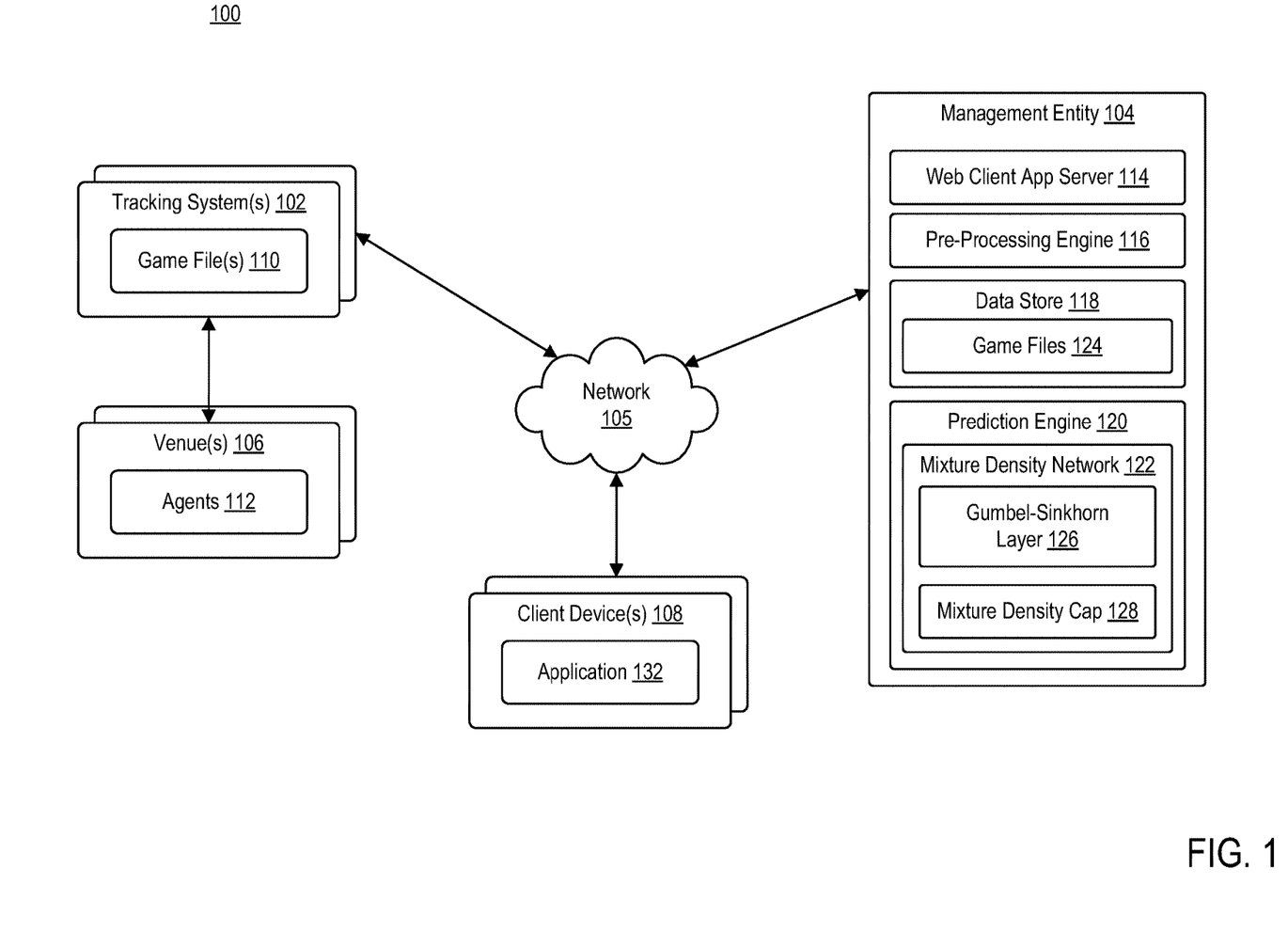
FIG. 1 is a block diagram illustrating a computing environment, according to example embodiments.

FIG. 1 is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be positioned in a venue 106. For example, venue 106 may be configured to host a sporting event that includes one or more agents 112. Tracking system 102 may be configured to record the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In some embodiments, tracking system 102 may be a radio-based system using, for example, radio frequency identification (RFID) tags worn by players or embedded in objects to be tracked. Generally, tracking system 102 may be configured to sample and record, at a high frame rate (e.g., 25 Hz). Tracking system 102 may be configured to store at least player identity and positional information (e.g., (x, y) position) for all agents and objects (e.g., ball, puck, etc.) on the playing surface for each frame in a game file 110.

Tracking system 102 may be configured to communicate with organization computing system 104 via network 105. Organization computing system 104 may be configured to manage and analyze the data captured by tracking system 102. Organization computing system 104 may include at least a web client application server 114, a pre-processing engine 116, a data store 118, and prediction engine 120. Each of pre-processing engine 116 and prediction engine 120 may be comprised of one or more software modules. The one or more software modules may be collections of code or instructions stored on a media (e.g., memory of organization computing system 104) that represent a series of machine instructions (e.g., program code) that implement one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data store 118 may be configured to store one or more game files 124. Each game file 124 may be captured and generated by a tracking system 102. In some embodiments, each of the one or more game files 124 may include all the raw data captured from a particular game or event. For example, the raw data captured from a particular game or event may include x-,y-coordinates of the game.

Pre-processing engine 116 may be configured to process data retrieved from data store 118. For example, pre-processing engine 116 may be configured to generate one or more sets of information that may be used to train components of prediction engine 120 that are associated with predicting a team's formation. Pre-processing engine 116 may scan each of the one or more game files stored in data store 118 to identify one or more metrics that include, but are not limited to, the team that has possession, the opponent, number of players on each team, x-,y-coordinates of the ball (or puck), and the like. In some embodiments, game context may be provided, such as, but not limited to, the current score, time remaining in the game, current quarter/half/inning/period, and the like.

Prediction engine 120 may be configured to eliminate permutation noise inherent in sports data and predict the underlying formation of a team. For example, given a set of inputs (e.g., team, opponent, ball location, possession, etc.), prediction engine 120 may be configured to predict expected positions of the players. In some embodiments, the expected positions of the players may be parameterized by a set (e.g., a mixture) of n p-dimensional means and (p×p)-dimensional covariances, where n may be representative of the number of mixtures and p may be representative of the number of players. As output, prediction engine 120 may generate an optimal permutation or optimal formation. In some embodiments, prediction engine 120 may also output a semantic label associated with the optimal formation. For example, prediction engine 120 may output "4-4-2 formation," "4-3-3 formation," "3-5-2 formation," "1-3-1" formation," and the like.

Prediction engine 120 may include a deep neural network, such as, but not limited to, mixture density network 122. Mixture density network 122 may be trained to predict the optimal permutation or optimal formation of players given a set of inputs (e.g., team, opponent, ball location, possession, etc.). Mixture density network 122 may include Gumbel-Sinkhorn (GS) layer 126 and mixture density cap 128.

GS layer 126 may be trained to learn the optimal permutation. For example, given the set of inputs, GS layer 126 may be trained to perform a soft-assignment of each player to each role. This may allow for back-propagation, thus enabling prediction engine 120 to cast the problem in terms of a permutation-learning step instead of a permutation-eliminating step. Because the task is now to predict the likely distribution of player positions, those frames which are more predictive (i.e., well-formed and resembling the template) may contribute more to the overall prediction. Using soft-assignment of each player to each role and back-propagation, GS layer 126 may learn to identify the optimal permutation from a set of possible permutations.

Generally, GS layer 126 may include a Sinkhorn operator that allows for calculation of the likelihood that a permutation of player orders is a beneficial permutation. However, to apply a permutation for the mixture density network, mixture density network 122 may need to threshold (e.g., argmax) the likelihood of a permutation. This is, however, is not a straightforward process because the argmax is not differentiable. In other words, the loss coming from mixture density layer cannot propagate to the permutation learning layer (e.g., GS layer 126). To bypass the argmax, a Gumbel softmax may be used during training to allow for end-to-end learning.

In some embodiments, GS layer 126 may work by iteratively normalizing rows and columns of a matrix representation of the data until the matrix is the permutation matrix that amounts to a softmax activation function.

In some embodiments, to apply the Sinkhorn operator (i.e., to make a network that is permutation equivariant), a neural network that has N outputs, each with N features, where N is the number of players may be used. Each output may be the row of a matrix and GS layer 126 may apply the Sinkhorn operator to this matrix.

Mixture density cap 128 may be configured to learn how to predict a distribution of player positions given the input context (e.g., team, opponent, possession, ball location, etc.) and the permutation output from GS layer 126. For example, mixture density cap 128 may be trained to learn the formation by predicting the underlying distributions, which may model player positions. By learning these distributions, mixture density cap 128 may predict the formation in highly specific contexts or even unknown contexts. This is an important achievement over conventional approaches. For example, in conventional approaches, as the context becomes increasingly specific (e.g., when the ball is in a specific location on the playing surface), the number of examples is severely reduced and the observed "formation" becomes non-sensical.

In some embodiments, mixture density cap 128 may be configured to predict the likelihood of all player positions as a mixture of gaussians, with mix weight $\pi_i$, mean $\mu_i$, and variance $\sigma_i$. To find the optimal values of $\pi$, $\mu$, and $\sigma$, mixture density network 122 may predict a set of $\pi$s, $\mu$s, $\sigma$s and the likelihood of a batch of real samples may be calculated. This typically requires that the permutation of players be known. As such, the permutations learned in GS layer 126 have to be applied. By using mixture density cap 128, mixture density network 122 may be regularized in the limit of little context specific data.

Given the optimal permutation or optimal formation, prediction engine 120 may use this information to predict a role or location of a missing player. For example, when leveraging broadcast video information, due to camera angles and the overall motion of the game, one or more players currently on the playing surface may be out of the line-of-sign of the cameras. Prediction engine 120 may leverage the optimal formation prediction to identify the role and/or location of players that are outside the field of view of the camera. Prediction engine 120 may generate such prediction by transforming the current formation prediction into a player position distribution, whereby the position of each player position may be predicted. Prediction engine 120 may utilize this information to estimate those missing players and/or correct false positive identifications in computer vision systems.

In some embodiments, prediction engine 120 may be provided with a priori knowledge about the current formation of a team. For example, prediction engine 120 may be provided with human annotated or machine annotated input data. Given this a priori information, prediction engine 120 can predict player positions within that formation. In this manner, prediction engine 120 may be configured to estimate player positions of players missing from the broadcast stream.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 132. Application 132 may be representative of a web browser that allows access to a website or a stand-alone application. Client device 108 may use access application 132 to access one or more functionalities of organization computing system 104. Client device 108 may communicate over network 105 to request a webpage, for example, from web client application server 114 of organization computing system 104. For example, client device 108 may be configured to execute application 132 to access content managed by web client application server 114. The content that is displayed to client device 108 may be transmitted from web client application server 114 to client device 108, and subsequently processed by application 132 for display through a graphical user interface (GUI) of client device 108.

Figure 2:
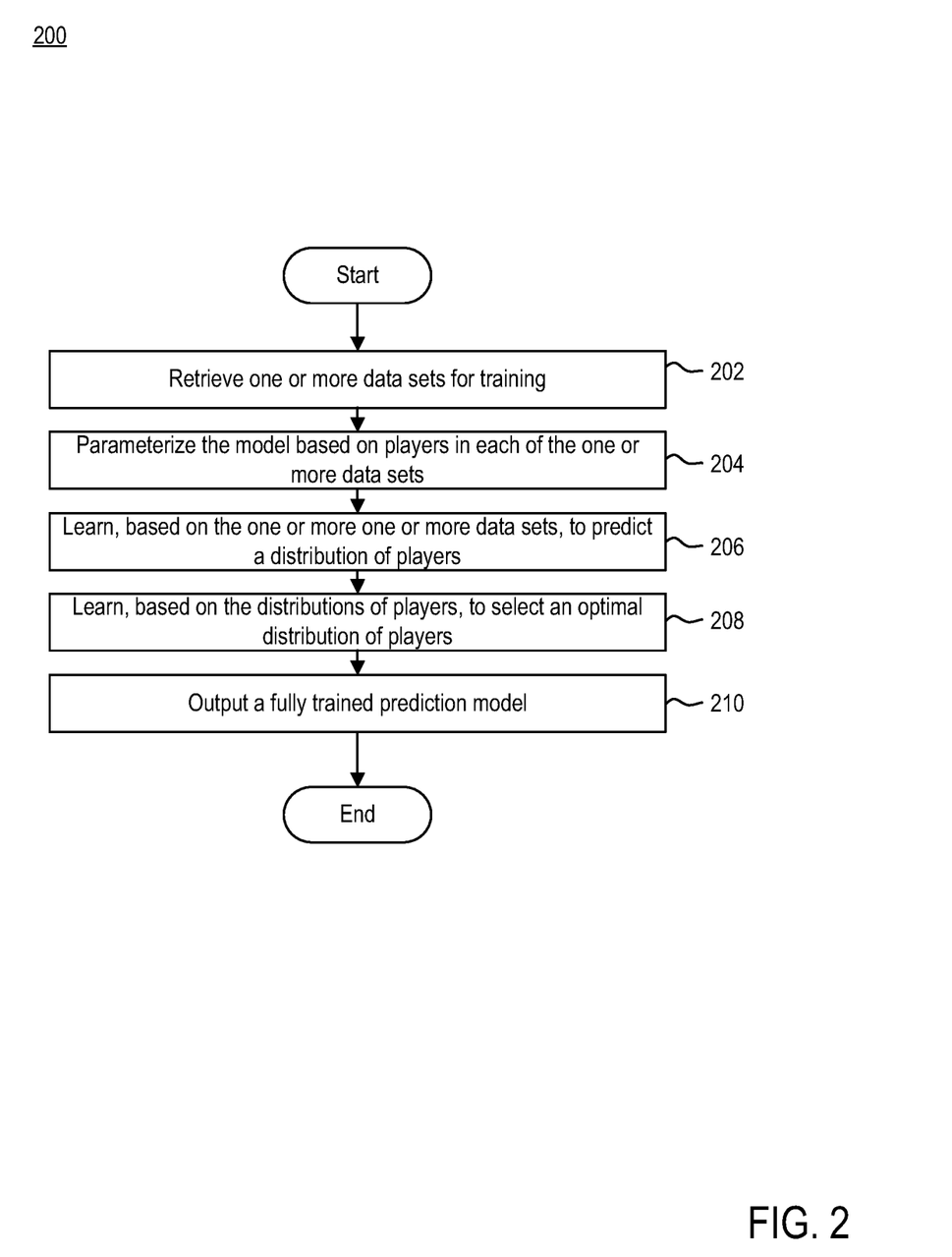
FIG. 2 is a flow diagram illustrating a method of training mixture density network, according to example embodiments.

FIG. 2 is a flow diagram illustrating a method 200 of training mixture density network 122, according to example embodiments. Method 200 may begin at step 202.

At step 202, organization computing system 104 may retrieve one or more sets of event data from data store 118. For example, pre-processing engine 116 may retrieve the one or more sets of event data from data store 118. In some embodiments, event data may include information associated with each possession of a given match. For example, event data may include team with possession, opponent, x-,y-coordinates of the ball, and the like. As those skilled in the art recognize, each game or match may include a plurality of sets of data, each set of data corresponding to a respective possession or partial possession.

At step 204, organization computing system 104 may parameterize mixture density network 122 based on the one or more sets of data. For example, pre-processing engine 116 may parameterize mixture density network 122 by a set (i.e., mixture) of n p-dimensional means and (p×p)-dimensional covariances, where n may represent the number of mixtures and p may represent the number of players.

At step 206, organization computing system 104 may learn, based on the one or more data sets, to predict an optimal formation of players. For example, GS layer 126 may learn to perform a soft-assignment of each player to each role based on at least one or more of the team with possession, the opponent, and the x-,y-coordinates of the ball or puck. The soft-assignment of each player to each role may result in a set of possible permutations generated. Using backpropagation, GS layer 126 may learn how to identify the optimal permutation from a set of possible permutations.

In some embodiments, prediction engine 120 may learn a semantic label associated with each optimal formation. For example, prediction engine 120 may learn to generate a semantic label, such as, but not limited to, "4-4-2 formation," "4-3-3 formation," "3-5-2 formation," "1-3-1" formation," and the like.

At step 208, organization computing system 104 may learn, based on the one or more data sets and the optimal permutation, a distribution of players. For example, mixture density cap 128 may be trained to learn the formation by predicting the underlying distributions, which may model player positions. By learning these distributions, mixture density cap 128 may predict the formation in highly specific contexts or even unknown contexts.

At step 210, organization computing system 104 may output a fully trained prediction model. For example, organization computing system 104 may output a fully trained mixture density network 122 configured to predict a formation of a team.

Figure 3:
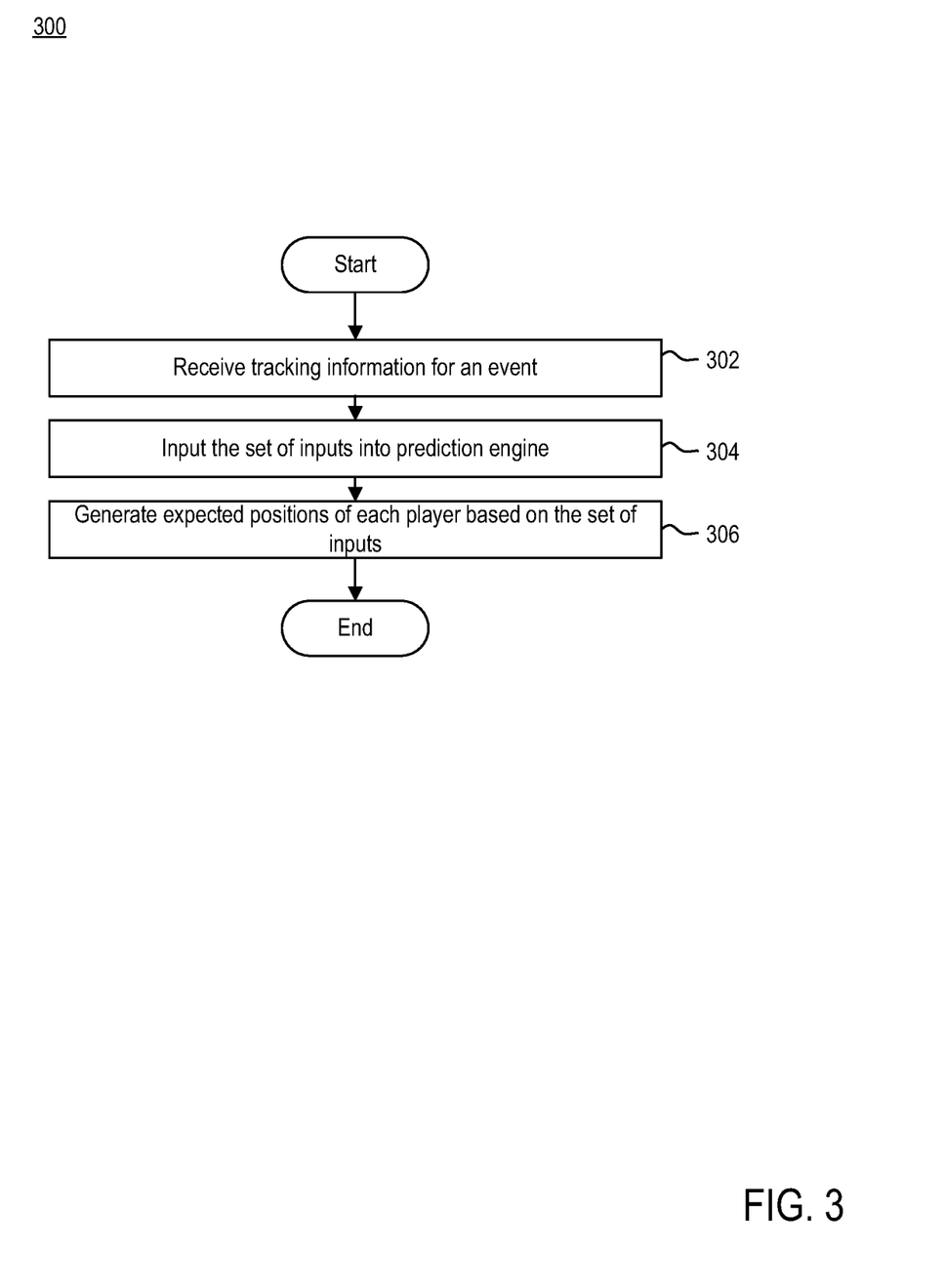
FIG. 3 is a flow diagram illustrating a method of predicting a formation of a team, according to example embodiments.

FIG. 3 is a flow diagram illustrating a method 300 of predicting a formation of a team, according to example embodiments. Method 300 may begin at step 302.

At step 302, organization computing system 104 may receive event information for a given match or possession. For example, organization computing system 104 may receive event information from client device 108. In some embodiments, event information may include at least data related to one or more of the team with the ball, the opponent, and x-,y-coordinates of the ball or puck.

At step 304, organization computing system 104 may input the event information into prediction engine 120. In some embodiment, inputting the event information into prediction engine 120 may include parameterizing mixture density network 122 based on the event data. For example, pre-processing engine 116 may parameterize mixture density network 122 by a set (i.e., mixture) of n p-dimensional means and (p×p)-dimensional covariances, where n may represent a number of mixtures and p may represent a number of players described in the event data.

At step 306, organization computing system 104 may generate expected positions of each player based on the event information. GS layer 126 may generate an optimal permutation based on the event data. For example, using a soft-assignment of each player to each role based on at event information, GS layer 126 may generate a plurality of possible permutations. From the plurality of possible permutations, GS layer 126 may identify the optimal permutation. Mixture density cap 128 may predict the underlying distributions of each player based on the event information and the output from GS layer 126. Mixture density cap 128 may then predict the formation of the players.

In some embodiments, prediction engine 120 may also output a semantic label associated with the optimal formation. For example, prediction engine 120 may output "4-4-2 formation," "4-3-3 formation," "3-5-2 formation," "1-3-1" formation," and the like.

As those skilled in the art recognize, mixture density network 122 offers numerous advantages over conventional systems. First, mixture density network 122 may be configured to generate a multi-modal distribution of likely player positions. As teams are rarely found in their exact formation, such functionality aids in capturing the uncertainty and variability of sport formations. Second, mixture density network 122 may be able to model the interaction of all players simultaneously. For example, mixture density network 122 may generate, as output, a 2p-dimensional distribution, which describes the players' positioning, where p may represent the number of players and the factor of 2 may be based on the x-, y-coordinates. This allows for mixture density network 122 to not only model the expected positions of the players, but also how variation in one player's location may impact another. In contrast, conventional approaches treat this as a two, p-dimensional distributions, and therefore is incapable of identifying or capturing the interaction between players.

Figure 4:
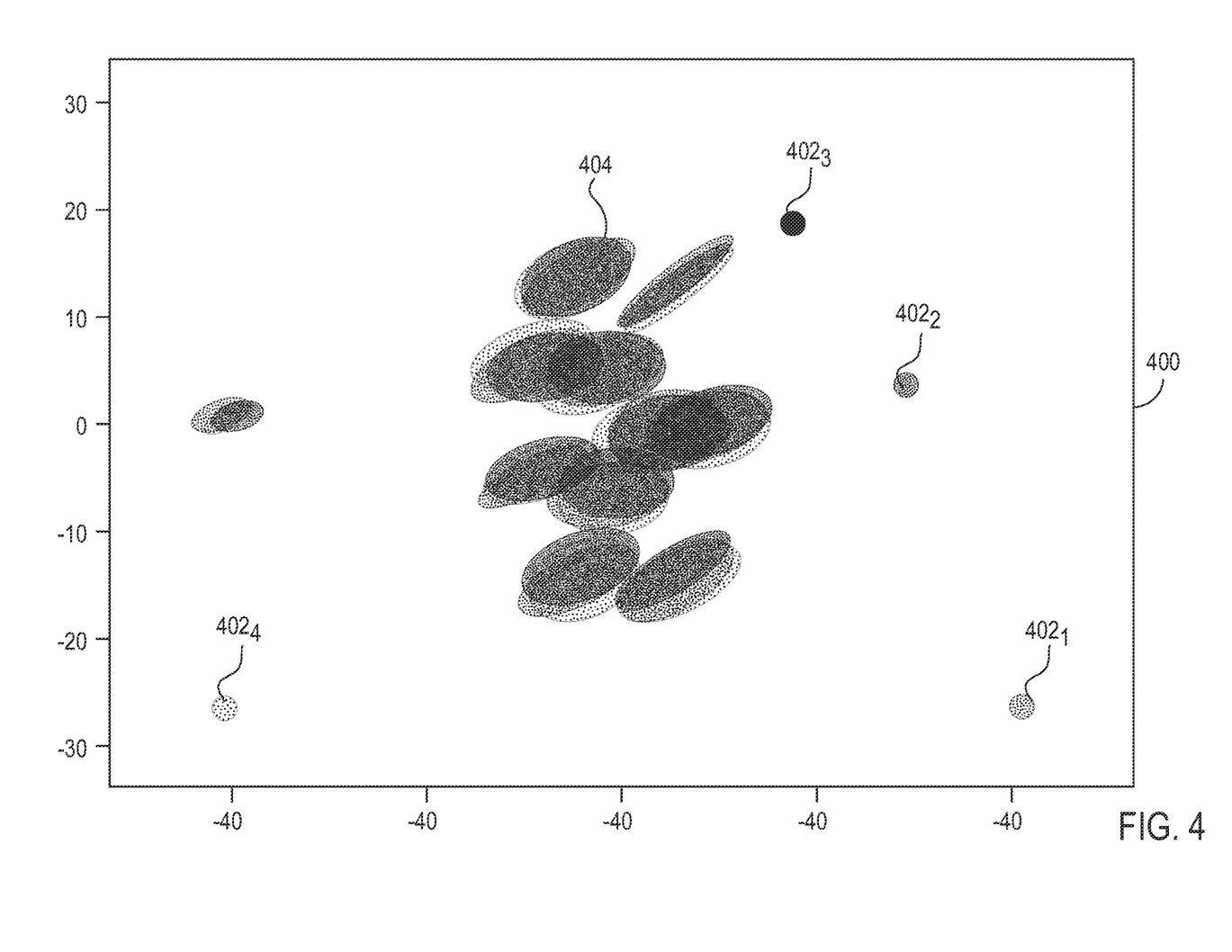
FIG. 4 illustrates a chart illustrating an exemplary player distribution, according to example embodiments.

FIG. 4 illustrates a chart 400 illustrating an exemplary player distribution, according to example embodiments. As illustrated, chart 400 may include ball locations $402_1$-$402_4$ (generally "ball location 402") and player distributions 404. Each player distribution may correspond to a player's distribution and the color may corresponds to a ball location 402 that generated it. As illustrated, the team is in a base 4-3-2-1 formation, but that the exact shape of the team and positioning of the players varies as the location of the ball changes.

Figure 5A:
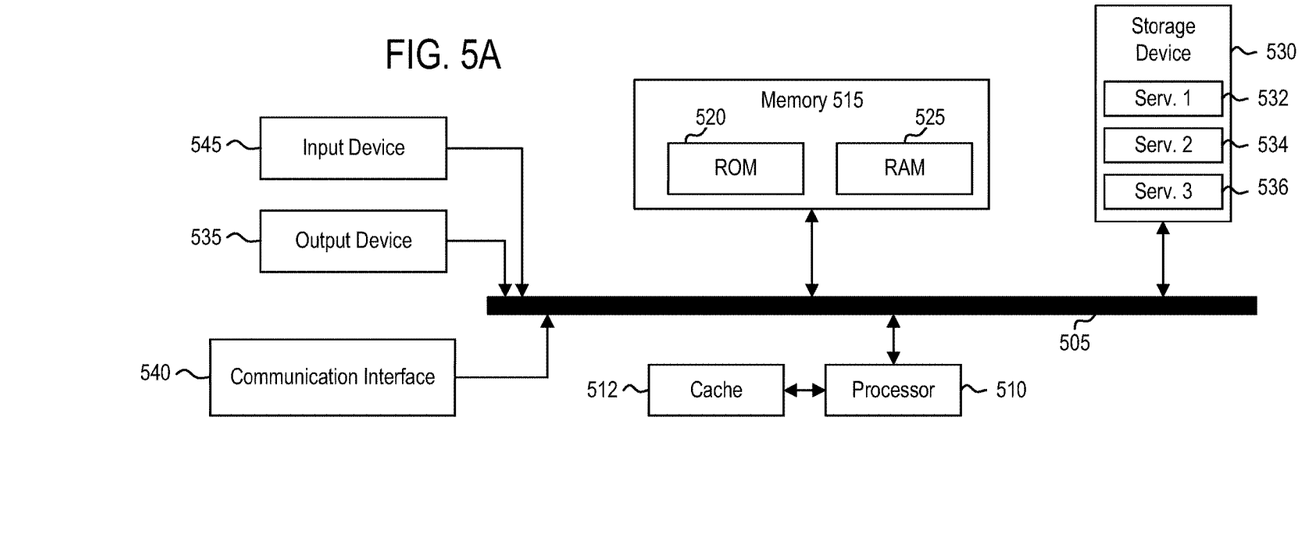
FIG. 5A is a block diagram illustrating a computing device, according to example embodiments.

FIG. 5A illustrates an architecture of a computing system 500, according to example embodiments. System 500 may be representative of at least a portion of organization computing system 104. One or more components of system 500 may be in electrical communication with each other using a bus 505. System 500 may include a processing unit (CPU or processor) 510 and a system bus 505 that couples various system components including the system memory 515, such as read only memory (ROM) 520 and random access memory (RAM) 525, to processor 510. System 500 may include a cache of high-speed memory connected directly with, in close proximity to, or integrated as part of processor 510. System 500 may copy data from memory 515 and/or storage device 530 to cache 512 for quick access by processor 510. In this way, cache 512 may provide a performance boost that avoids processor 510 delays while waiting for data. These and other modules may control or be configured to control processor 510 to perform various actions. Other system memory 515 may be available for use as well. Memory 515 may include multiple different types of memory with different performance characteristics. Processor 510 may include any general-purpose processor and a hardware module or software module, such as service 1 532, service 2 534, and service 3 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction with the computing system 500, an input device 545 may represent any number of input mechanisms, such as a microphone for speech, a touch-sensitive screen for gesture or graphical input, keyboard, mouse, motion input, speech and so forth. An output device 535 (e.g., display) may also be one or more of a number of output mechanisms known to those of skill in the art. In some instances, multimodal systems may enable a user to provide multiple types of input to communicate with computing system 500. Communications interface 540 may generally govern and manage the user input and system output. There is no restriction on operating on any particular hardware arrangement and therefore the basic features here may easily be substituted for improved hardware or firmware arrangements as they are developed.

Storage device 530 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 may include services 532, 534, and 536 for controlling the processor 510. Other hardware or software modules are contemplated. Storage device 530 may be connected to system bus 505. In one aspect, a hardware module that performs a particular function may include the software component stored in a computer-readable medium in connection with the necessary hardware components, such as processor 510, bus 505, output device 535, and so forth, to carry out the function.

Figure 5B:
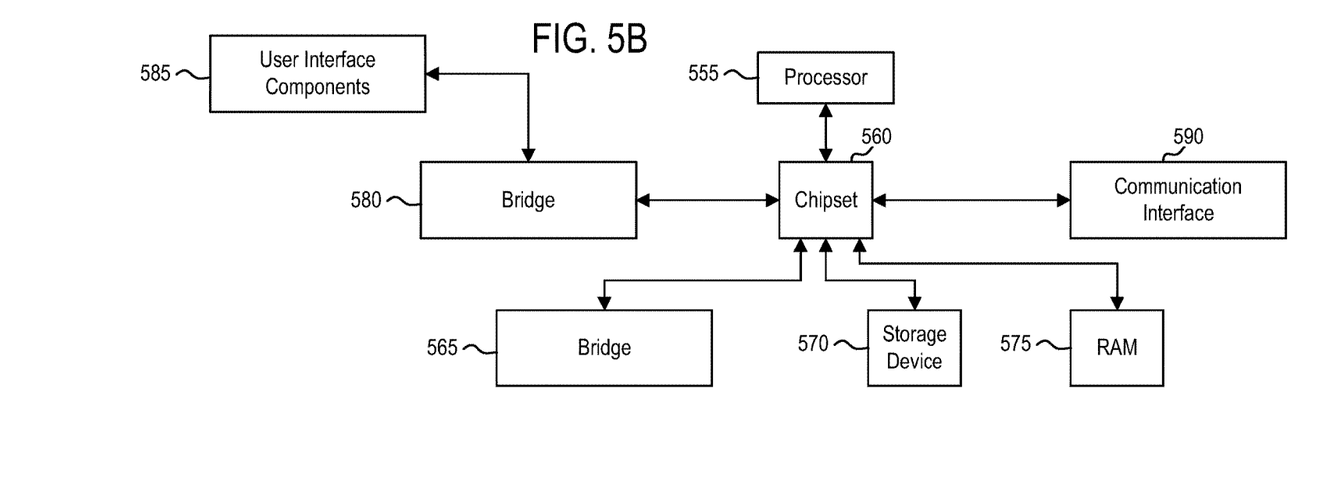
FIG. 5B is a block diagram illustrating a computing device, according to example embodiments.

FIG. 5B illustrates a computer system 550 having a chipset architecture that may represent at least a portion of organization computing system 104. Computer system 550 may be an example of computer hardware, software, and firmware that may be used to implement the disclosed technology. System 550 may include a processor 555, representative of any number of physically and/or logically distinct resources capable of executing software, firmware, and hardware configured to perform identified computations. Processor 555 may communicate with a chipset 560 that may control input to and output from processor 555. In this example, chipset 560 outputs information to output 565, such as a display, and may read and write information to storage device 570, which may include magnetic media, and solid state media, for example. Chipset 560 may also read data from and write data to RAM 575. A bridge 580 for interfacing with a variety of user interface components 585 may be provided for interfacing with chipset 560. Such user interface components 585 may include a keyboard, a microphone, touch detection and processing circuitry, a pointing device, such as a mouse, and so on. In general, inputs to system 550 may come from any of a variety of sources, machine generated and/or human generated.

Chipset 560 may also interface with one or more communication interfaces 590 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 555 analyzing data stored in storage device 570 or RAM 575. Further, the machine may receive inputs from a user through user interface components 585 and execute appropriate functions, such as browsing functions by interpreting these inputs using processor 555.

It may be appreciated that example systems 500 and 550 may have more than one processor 510 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A computer-implemented method for training a mixture density network to predict a team formation, the computer-implemented method comprising:
   receiving, by one or more processors, one or more sets of event data from a data store;
   parameterizing, by the one or more processors, a neural network based on the one or more sets of event data;
   training, by the one or more processors, the neural network to predict an optimal formation of a plurality of players of a team and to generate a semantic label corresponding to the optimal formation;
   training, by the one or more processors, the neural network to predict a distribution of the plurality of players of the team based on the one or more sets of event data and the optimal formation of the plurality of players; and
   outputting, by the one or more processors, the trained neural network configured to predict a formation of the team and generate the semantic label.

2. The computer-implemented method of claim 1, wherein each of the one or more sets of event data include information associated with possession information of a sporting match.

3. The computer-implemented method of claim 1, wherein training the mixture density network to predict the optimal formation of the plurality of players comprises:
   generating, by the one or more processors, a set of possible permutations by soft-assigning each player to a role in each permutation of the set of possible permutations.

4. The computer-implemented method of claim 3, wherein the optimal formation is selected from the set of possible permutations.

5. The computer-implemented method of claim 1, the computer-implemented method further comprising:
   generating, by the one or more processors, a semantic label associated with the optimal formation.

6. The computer-implemented method of claim 5, the computer-implemented method further comprising:
   outputting, by the one or more processors, the semantic label associated with the optimal formation.

7. The computer-implemented method of claim 1, the training the neural network to predict the distribution of the plurality of players based on the one or more sets of event data further comprising:
   predicting, by the one or more processors, at least one underlying distribution corresponding to a model of one or more player positions.

8. A system for training a mixture density network to predict a team formation, comprising:
   a processor; and
   a memory having programming instructions stored thereon, which, when executed by the processor, performs one or more operations, comprising:
      receiving one or more sets of event data from a data store;
      parameterizing a neural network based on the one or more sets of event data;
      training, the neural network to predict an optimal formation of a plurality of players of a team and to generate a semantic label corresponding to the optimal formation;
      training the neural network to predict a distribution of the plurality of players of the team based on the one or more sets of event data and the optimal formation of the plurality of players; and
      outputting the trained neural network configured to predict a formation of the team and generate the semantic label.

9. The system of claim 8, wherein each of the one or more sets of event data include information associated with possession information of a sporting match.

10. The system of claim 8, wherein training the neural network to predict the optimal formation of the plurality of players comprises:
    generating a set of possible permutations by soft-assigning each player to a role in each permutation of the set of possible permutations.

11. The system of claim 10, wherein the optimal formation is selected from the set of possible permutations.

12. The system of claim 8, the operations further comprising:
    generating a semantic label associated with the optimal formation.

13. The system of claim 12, the operations further comprising:
    outputting the semantic label associated with the optimal formation.

14. The system of claim 8, the training the neural network to predict the distribution of the plurality of players based on the one or more sets of event data further comprising:
    predicting at least one underlying distribution corresponding to a model of one or more player positions.

15. A non-transitory computer readable medium including one or more sequences of instructions that, when executed by one or more processors, causes a computing system to perform operations, comprising:
    receiving, by the computing system, one or more sets of event data from a data store;
    parameterizing, by the computing system, a neural network based on the one or more sets of event data;
    training, by the computing system, the neural network to predict an optimal formation of a plurality of players of a team and to generate a semantic label corresponding to the optimal formation;
    training, by the computing system, the neural network to predict a distribution of the plurality of players of the team based on the one or more sets of event data and the optimal formation of the plurality of players; and
    outputting, by the computing system, the trained neural network configured to predict a formation of the team and generate the semantic label.

16. The non-transitory computer readable medium of claim 15, wherein each of the one or more sets of event data include information associated with possession information of a sporting match.

17. The non-transitory computer readable medium of claim 15, wherein training the neural network to predict the optimal formation of the plurality of players comprises:
    generating, by the computing system, a set of possible permutations by soft-assigning each player to a role in each permutation of the set of possible permutations.

18. The non-transitory computer readable medium of claim 17, wherein the optimal formation is selected from the set of possible permutations.

19. The non-transitory computer readable medium of claim 15, the operations further comprising:
 generating, by the one or more processors, a semantic label associated with the optimal formation.

20. The non-transitory computer readable medium of claim 19, the operations further comprising:
 outputting, by the computing system, the semantic label associated with the optimal formation.

\* \* \* \* \*